Dec. 16, 1969          S. A. FRANCIS          3,483,749
BATHYTHERMOGRAPH SYSTEM
Original Filed April 29, 1965          6 Sheets-Sheet 1
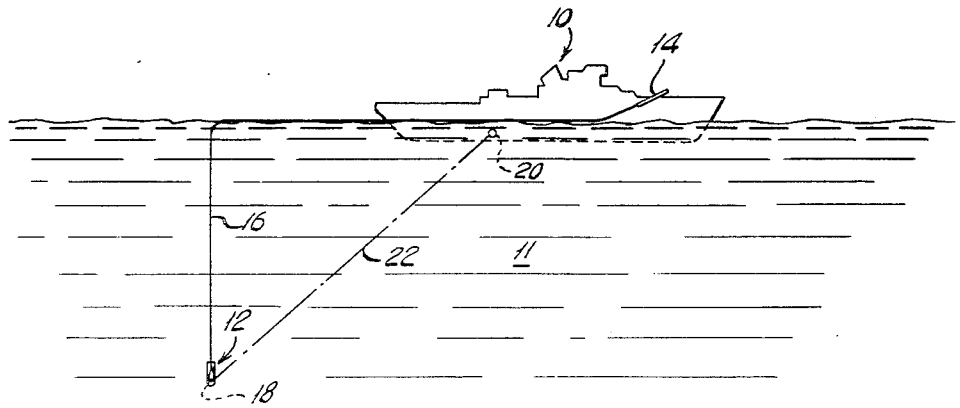
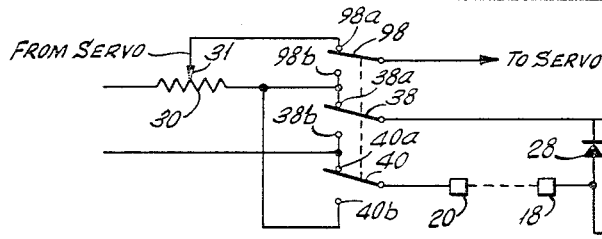
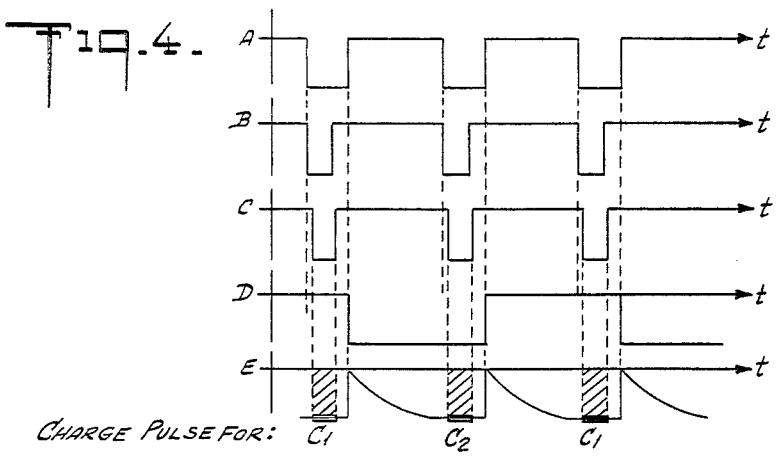
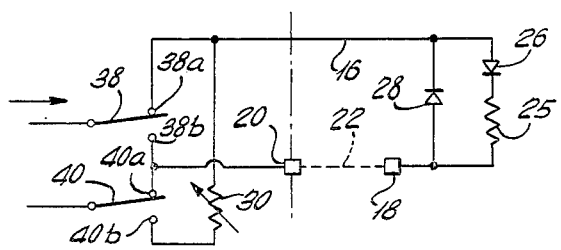
INVENTOR
SAMUEL A. FRANCIS
BY
Nolte & Nolte
ATTORNEYS

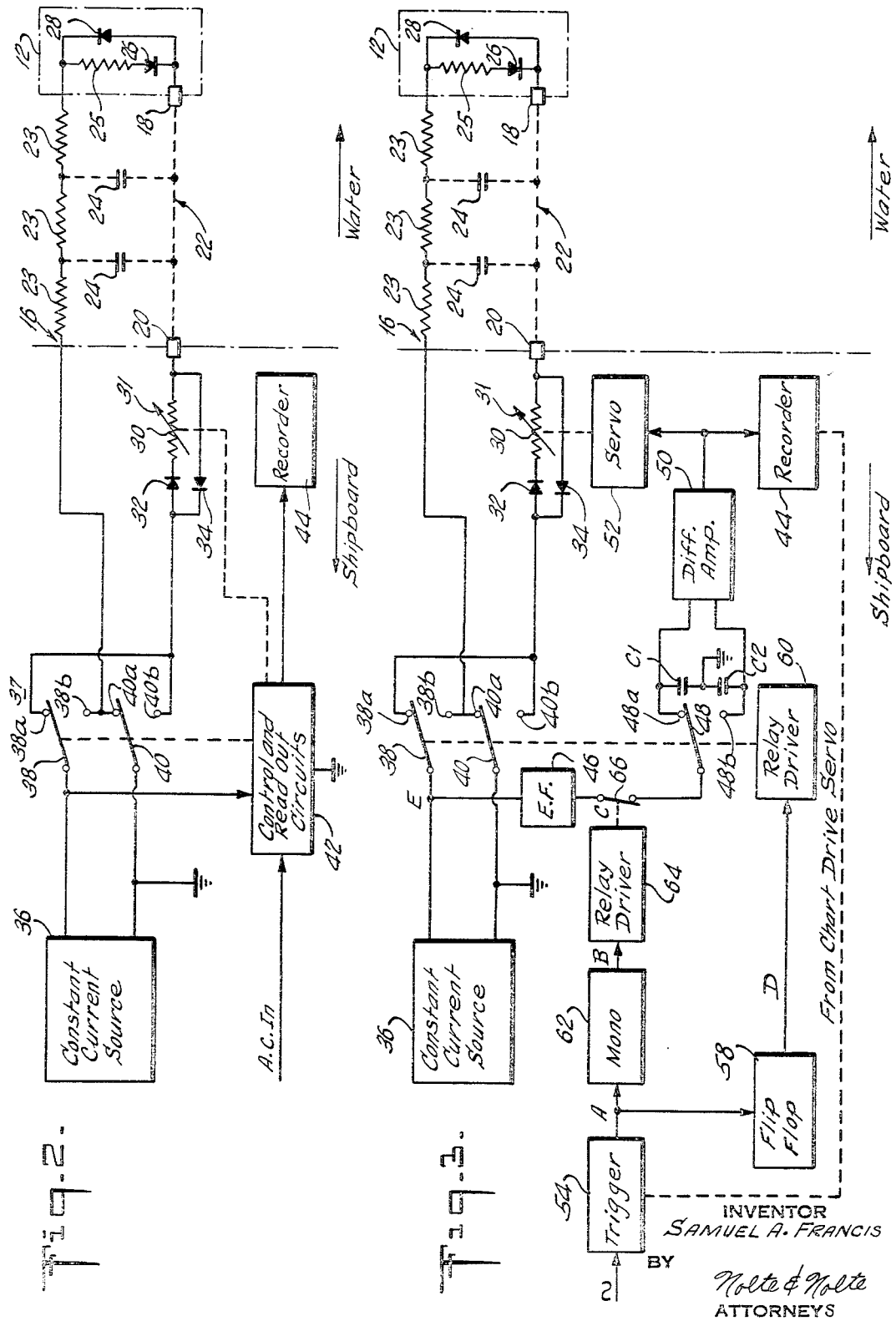

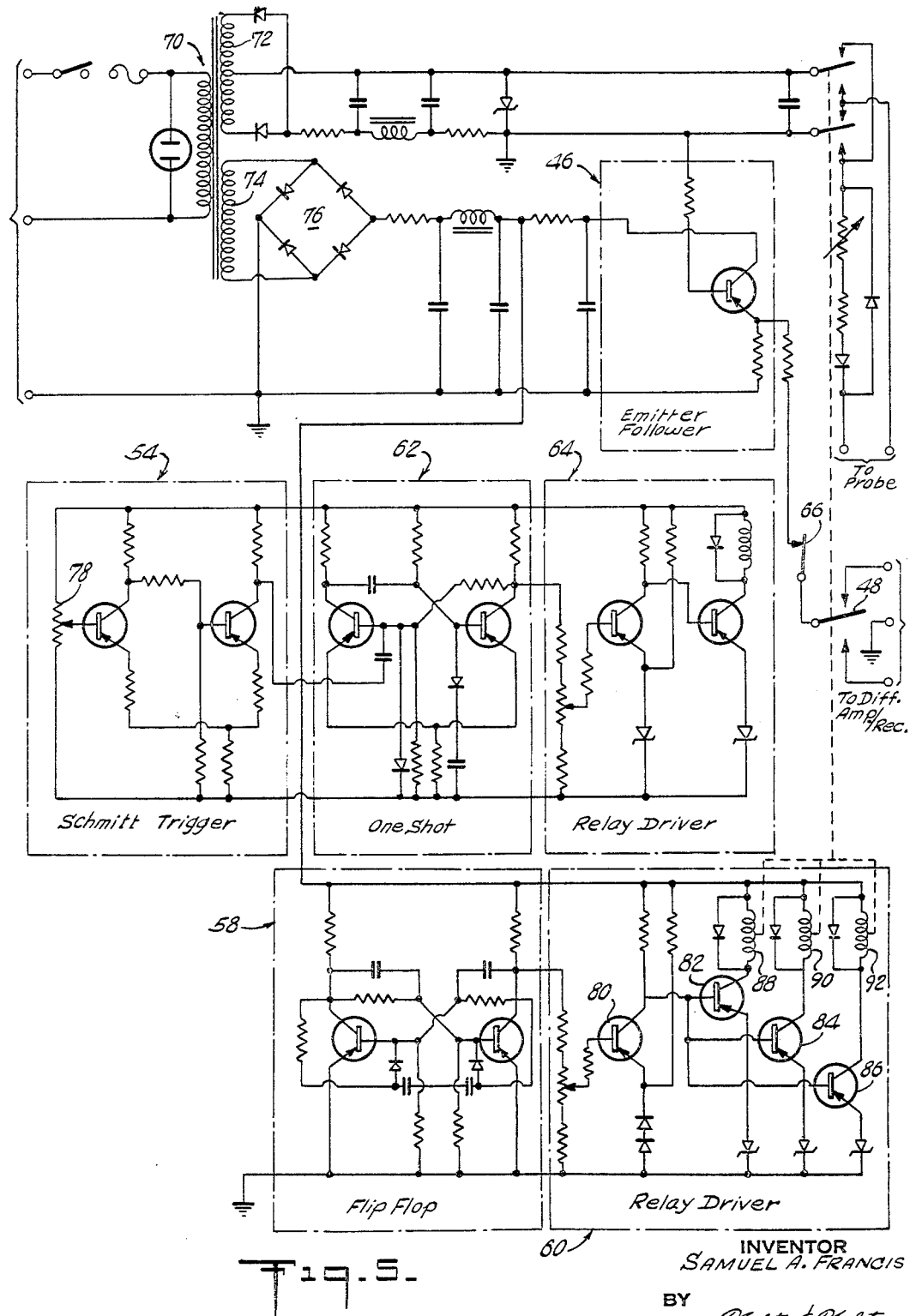

INVENTOR.
SAMUEL A. FRANCIS

BY Nolte & Nolte

ATTORNEYS

Dec. 16, 1969     S. A. FRANCIS     3,483,749

BATHYTHERMOGRAPH SYSTEM

Original Filed April 29, 1965     6 Sheets-Sheet 6

INVENTOR.
SAMUEL A. FRANCIS

BY Nolte & Nolte

ATTORNEYS nited States Patent Office 3,483,749
Patented Dec. 16, 1969

3,483,749
BATHYTHERMOGRAPH SYSTEM
Samuel A. Francis, Marion, Mass., assignor, by mesne assignments, to The Buzzard Corporation, Marion, Mass., a corporation of Massachusetts
Continuation of application Ser. No. 451,735, Apr. 29, 1965. This application July 22, 1968, Ser. No. 749,904
Int. Cl. G01k 1/08, 5/18; G01w 1/00
U.S. Cl. 73—344         30 Claims

ABSTRACT OF THE DISCLOSURE

A property sensing resistance is housed in a probe which is adapted to be deployed into a water medium. The property sensing resistance is connected by a single wire and the sea return path to a known resistance located at a measuring station located aboard a vessel. Current pulses are caused to flow in opposite directions through the known and unknown resistances. By measuring and comparing signals derived from the opposite direction pulses, an error signal is derived indicative of the property being measured and independent of the impedance of the transmission path.

---

This application is a continuation-in-part of copending application Ser. No. 395,712, filed Sept. 11, 1964, and a continuation of application Ser. No. 451,735, filed Apr. 29, 1965, both now abandoned.

This invention relates to the measuring arts wherein measurements of a property must be transmitted from a remote location to a local station via a transmission path, the impedance characteristics of which are variable.

Although not necessarily so limited, the present invention has particular utility in a bathythermograph probe of the type illustrated in U.S. Patent application Ser. No. 342,338 of Campbell et al., filed on Jan. 31, 1964, and now Patent No. 3,221,556. That application discloses apparatus for deploying a sensor probe into a body of water and continuously detecting changes in a particular property of the water as the probe traverses the water. For example, the device is particularly useful in recording temperature as a function of depth, which is of interest to persons concerned with the operation of sonar devices, such as weapons systems and fish detection apparatus.

According to Patent No. 3,221,556, an expendable probe includes a property sensing device such as a thermistor, the resistance of which is dependent upon temperature, connected by wire to a source of potential on the launching vessel. The probe is cast into the water, and the wire deployed from the vessel and probe in a unique manner, which, however, is not a feature of the present invention. As the probe falls through the water, the potential difference, caused by the change in thermistor resistance, is recorded on a chart recorder, wherein the record medium is advanced at a rate proportional to the known rate of descent of the probe. One feature of that invention is the use of the water itself as a sea return path, thus eliminating a return wire which would normally be necessary. However, a considerable length of wire is normally deployed, and since the wire resistance changes significantly due to the range of temperature encountered, it is necessary to provide some means to compensate for the resistance changes of the wire, so that the recording apparatus will only be responsive to resistance changes of the thermistor.

Accordingly, a measuring system is provided for use with a single wire sensor probe wherein deleterious effects due to the variable characteristics of the sensing wire may be avoided without resort to a separate compensating wire.

Briefly, according to this embodiment of the invention, a property sensing resistance in the probe is connected by a single wire and sea return path to a known resistance at the local station. The variable unknown resistance to be measured is supplied through the transmission path with a constant current. Polarity sensitive switches are connected in the circuit in such a manner that unipolar current pulses alternately flow through the known and unknown resistances in opposite directions. By measuring the difference in the respective signals passed through the known and unknown resistances, an error signal can be obtained indicative of the property being measured without significant error due to the variations in the resistance characteristics of the transmission path.

The higher the pulse frequency, the more frequent the measurements and thus the greater the resolution. However, in an A.C. or pulse type device, a unique problem occurs due to the existence of a wire to water shunt capacitance. This capacitance increases considerably when a great length of wire has been deployed into the water, thereby increasing the rise time of the applied pulses to limit the frequency response or resolution of the entire device, as explained more fully below.

Accordingly, a measuring device as above described is provided to include means for optimizing the overall performance during the continuous movement of the probe, in view of the increased wire to water shunt capacitance, by enabling continuous variation of the applied pulse frequencies as a function of probe depth, i.e. wire to water capacitance.

In another embodiment, a measuring system is provided wherein the temperature compensating means includes a second wire in combination with a measuring bridge. The compensating wire is connected in one arm of the bridge and the sensing wire connected in another arm of the bridge, so that the impedance changes of the respective wires nullify each other. The interconnection of the two arms of the bridge is coupled to an electrode which connects through the sea return path to the probe to provide the power connection to the bridge. This device has been found to be practical and to yield excellent results.

In still another embodiment according to the invention, a three wire sensing probe is employed wherein the temperature compensating means includes the second wire in combination with the measuring bridge, and the third wire replaces the sea return path to provide power to the bridge circuit.

Accordingly, an object of the present invention is to provide a measuring device of the class described, wherein a separate wire is not required to compensate for the variable resistance characteristics of the transmission path.

Another object of the invention is to provide a single wire, sea return measuring device for recording a property of the ocean as a function of depth.

Yet another object of the invention is to provide a non-bridge type circuit for accurate measurements at a local station of a remote impedance, without compensation for the distributed transmission line parameters existing between the remote and local stations.

Another object of the present invention is to provide a measuring and recording apparatus for a two wire sensing probe for recording a property of the ocean as a function of depth.

Another object of the present invention is to provide a measuring and recording apparatus for a two wire probe including compensation means to compensate for resistance changes due to temperature in the conductors.

Another object of the present invention is to provide a measuring and recording apparatus for a two wire probe including electrodes for employing the conductivity of the ocean to supply power to the compensating means.

Another object of the present invention is to provide a three wire sensing probe for use with the above named measuring and recording apparatus for recording a property of the ocean as a function of depth and compensating for temperature charges in the wires without employing the conductive path of the ocean.

Another object of the present invention is to provide a three wire sensing probe for use with a measuring and recording apparatus for measuring a property of a non-conductive medium as a function of depth.

The manner in which the above and other objects of the invention are accomplished will be described in greater detail below, with reference to the following drawings, wherein similar reference characters denote similar elements through the several views:

FIG. 1 is a schematic illustration of the environment in which the invention has particular utility.

FIG. 2 is a general block diagram of an embodiment of the invention.

FIG. 3 is a detailed block diagram showing the individual elements which comprise FIG. 2.

FIG. 4 is a timing chart of the circuit illustrated in FIG. 3.

FIG. 5 is a schematic diagram of the circuit illustrated in FIG. 3.

FIGS. 6a and 6b are schematic diagrams of related embodiments of the invention as described with respect to FIGS. 2 and 3.

(A) SINGLE WIRE SYSTEM

Figure 7:
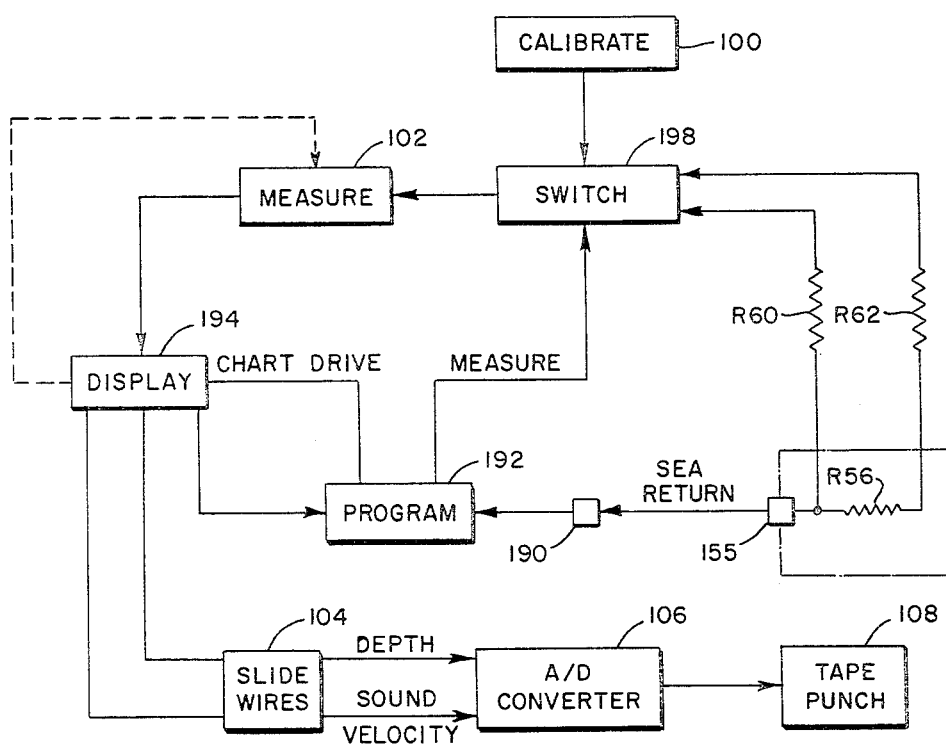
FIG. 7 is a block diagram of an electronic measuring and recording system for sensing a property from a remote location employing a two wire probe.

Referring to FIG. 1, the recording station is shown located on a boat 10 which is travelling on the surface of a body of water 11. A probe 12 has been launched from the boat by means of a tube launching device 14, and, as explained more fully in said Patent No. 3,221,556, a transmission wire 16 is deployed in vertical and horizontal directions from probe 12 and boat 10, respectively. Wire 16 connects a property sensing device, such as a thermistor, to the recording apparatus within boat 10. Within probe 12 the thermistor is electrically connected to a sea return electrode 18 which is in circuit with a shipboard electrode 20 on boat 10 through a sea return path indicated schematically at 22. The shipboard electrode 20 is coupled by conventional means to the shipboard recording apparatus.

Referring to FIGURE 2, the portion of the wire 16 deployed into the water may be considered as a plurality of resistors 23 and parallel capacitors 24 connected between line 16 and the adjacent water. Capacitors 24 are representative of the capacitance which exists between the wire 16 and the sea, the effects of which are explained in greater detail below.

The probe 12 contains the property sensing device 25 (for example, a thermistor) in series connection with a diode 26. A second diode 28, poled oppositely to diode 26, is connected in parallel across the combination of thermistor 25 and diode 26.

Aboard the ship the shipboard electrode 20 is coupled to a known local resistance which comprises a potentiometer 30 having a slidewire 31. A first diode 32 is connected in series with local resistance represented by a 30 and a second diode 34, polarized oppositely to diode 32, is coupled across the series connection. The measuring circuits, described above, are connected to a constant current source 36 via a chopper 37 including armatures 38 and 40 cooperating with terminals 38a, 38b and 40a, 40b, respectively, for feeding current pulses in opposite directions through the measuring circuits.

The measuring voltage, indicative of the change in resistance of thermistor 25, is derived from armature 38 and coupled to Control and Readout Circuit 42, the output of which is coupled to chart recorder 44 to record temperature as a function of depth. The output of Control and Readout Circuit 42 is also coupled to the slide wire 31 of potentiometer 30 to provide a null balancing circuit, as explained below.

In the illustrated configuration of chopper 37, negative pulses from current source 36 will flow through thermistor 25, while bypassing potentiometer 30. When the chopper armatures 38 and 40 switch to terminals 38b and 40b, respectively, the current pulses pass through potentiometer 30 but bypass thermistor 25. Specifically, if current source 36 provides armature 38 with a potential negative with respect to armature 40, and if chopper 37 is in its illustrated position, current flows in a circuit including aramature 38, terminal 38a, diode 34, sea return path 22, diode 26, thermistor 25, wire 16, terminal 40a and armature 40 to ground. When chopper 37 under the control of circuit 42, reverses its contacts, a current flows through armature 38, terminal 38b, wire 16, diode 28, sea return path 22, potentiometer 30, diode 32, terminal 40b and armature 40 to ground.

The current pulses alternately passed through the thermistor 25 and known resistance 30 are fed to the readout circuit 42 wherein they are stored and compared. Differential means, responsive to the difference in magnitude between these two pulses, couples an error signal to a recording apparatus 44 which records the relative magnitude of this signal. The recording medium of apparatus 44 may be moved at a rate related to the rate of descent of the probe, whereby the recorded information is indicative of the water temperature as a function of depth. The output of the recording medium 44 is mechanically linked to the slide wire 31 of potentiometer 30 driving the slide wire in a manner to equalize the respective amplitudes of the transmitted pulses. In this manner the invention incorporates the advantages of a null balancing servo system, especially, a lack of dependence upon the absolute magnitude of the measuring pulses.

The particular advantage of the above-described device is that every series resistance (wire, contact, etc.) is measured in both directions. Thus, when the difference between the two pulses in their respective directions is measured, these resistances will be cancelled. As a result, significant changes in the wire resistance due to varying thermal gradients will have no material effect on the accuracy of the desired measurements. As far as the wire to water capacitance is concerned, this value, which appears as a parallel impedance, will normally be of sufficiently high magnitude to have little effect on the desired measurements, although, as explained below, this increased capacitance for long lengths of wire can become a relevant consideration in other respects.

FIGURE 3 is a more detailed block diagram showing the manner in which the returning pulses are compared and the difference voltage produced to enable the desired record substantially free of effects due to the change in resistance of the transmission path.

The current pulses from chopper armature 38, derived from terminal 38a or 38b are fed to an emitter follower 46 and a third chopper armature 48. Armature 48 is adapted to contact terminal 48a or 48b to charge one of two storage capacitors C1 and C2, respectively. Thus, in the illustrated chopper position, the pulses which pass through thermistor 25, while bypassing the local resistance of potentiometer 30, charge storage capacitor C1. When the chopper armatures switch to their lower positions, the pulses which bypass thermistor 25 and pass through the local known resistance of potentiometer 30, are coupled to capacitor C2.

A differential amplifier 50, which is conventional, compares the voltages stored in capacitors C1 and C2 and produces an error voltage proportional to the difference therebetween or in other words the resistance change of thermistor 25. This difference or error voltage is coupled to the recorder 44 where it is recorded on a continually moving chart as discussed above. The output of differential amplifier 50 is also coupled to a servo mechanism 52, the output shaft of which mechanically controls the slide wire of potentiometer 30, whereby its resistance is altered toward the measured resistance of thermistor 25 to provide the null balancing system.

The shunt capacitance 24 between wire 16 and the sea increases as additional wire is deployed into the water, and becomes an important consideration because of its effect on the rise time of the applied pulses. This is a consideration limiting the maximum pulse frequency and therefore the resolution of the device as explained in the following.

As the shunt capacitance increases, the time required to charge such capacitance also increases. Measurements can only be taken when the voltage applied to the thermistor 25 or potentiometer 30 has reached a steady state value representative of only the resistance in the transmission path. Hence, as the shunt capacitance increases, the chopper frequency must be decreased to insure that the pulses will reach their steady state value for measurement purposes. However, it is not suitable to simply select a desired frequency useful at maximum capacitance, since for reduced chopper frequencies, significant errors may be introduced into the circuit when the probe is rapidly traversing a portion of the sea having large thermal gradients. This error may be particularly pronounced in cases wherein a non-electronic readout, such as a slow speed chart recorder, is used to record the measured results. Accordingly, it is an important feature of this invention to optimize overall performance by varying the chopper frequency in proportion to the wire to water shunt capacitance.

To this end, the chopper frequency is determined by a trigger generator 54 connected to an existing source of alternating potential. The output of trigger 54 is coupled through a bistable multivibrator or flip-flop 58 to a relay driver 60, which opens and closes the chopper armatures at the frequency of trigger 54. The frequency of trigger generator 54 may be controlled by an output from the chart drive servo of recorder 44 so that the frequency of the chopper is reduced as the wire to sea water capacitance increases. The trigger frequency may be controlled in any other manner, or it may be varied manually. Thus, trigger 54 enables reduction of the applied pulse frequency as the shunt capacitance increases to insure that the measured voltage differential is dependent only upon the change in resistance of thermistor 25.

It can be shown that although there is a certain amount of inductance associated with the circuit, the main time constant limiting the chopper frequency is the one which charges the shunt capacitance. The inductance in the circuit only improves the characteristics. Thus, assuming that the ship is moving at a speed of thirty knots and the 1,500 feet of wire will be deployed vertically and 3,000 feet horizontally, the chopper frequency should be linearly varied between seventy cycles per second and fourteen cycles per second. This, of course, is only an approximation and may be influenced by numerous factors.

Since the voltages at the chopper armatures do not reach the level of the applied pulses immediately, but instead approach this level in accordance with the time constant of the transmission path, it is necessary to "wait" before charging the measuring capacitors C1 and C2 until the voltage across armatures 38 and 40 is constant, representing only the resistance component of the line impedance. For this purpose, the output of trigger 54 is coupled to a monostable multivibrator 62, which operates a relay driver 64. Relay driver 64 actuates a switch 66 in the output line from emitter follower 46 during predetermined intervals of each measuring pulse to apply the respective voltages to capacitors C1 and C2 when the pulses have reached their maximum value.

The operation of the apparatus above-described may be more fully understood with reference to the timing charts of FIG. 4 showing wave forms A, B, C, D and E. FIG. 3 has been marked by corresponding letters to indicate where in the circuit these wave forms appear.

The A pulses produced by trigger 54 are coupled to flip-flop 58, the output of which, as represented at D, is a series of equal length negative and positive going pulses responsive to the positive going or trailing edge of a trigger pulse. Relay driver 60 is driven by flip-flop pulses D to transfer the chopper armatures between their respective $a$ and $b$ contacts, providing the solid line wave form of E which is applied to the input of emitter follower 46. The maximum value of wave form E is equal to the applied voltage from current source 36. As explained above, the slope of the curve is due to the time constant of the transmission path to the probe 12.

The trigger pulses A are also applied to monostable multivibrator 62 which is responsive to the negative going or leading edge of the trigger pulses, as shown as wave form B. These pulses B cause the relay driver 64 to open and close after a slight delay, as indicated by wave form C, prior to the change of state of flip-flop 58. Thus, at the time a flip-flop pulse transfers the chopper armature 48, switch 66 is held open to prevent charging of the selected capacitor C1 or C2 until the next trigger pulse causes driver 64 to close switch 66. Capacitors C1 and C2 are therefore alternately charged as indicated by the cross hatched portion of wave form E to a voltage dependent only upon the resistance values of thermistor 25 and potentiometer 30, respectively.

FIG. 5 is a schematic diagram of a preferred form of an embodiment of the invention illustrated in the block diagram in FIGS. 2 and 3. The conventionally available alternating voltage is applied to the primary of a transformer 70 having two secondaries 72 and 74. The rectified voltage from secondary 72 provides the measuring voltage which is coupled via wire 16 to the thermistor located within probe 12. This source determines the voltage level appearing in wave form E to charge the measuring capacitors C1 and C2.

The second transformer secondary 74 is coupled to a full wave rectifier 76 and conventional smoothing circuits to provide the operating voltages for the remaining elements of the circuit. All of the illustrated transistor circuits are conventional and therefore they are not described herein in detail.

The trigger generator 54 comprises a conventional Schmitt trigger, the base of the input transistor being coupled to a potentiometer 78, the slide wire of which may be varied as explained above to alter the frequency of the device during the measuring cycle.

The relay driver 60 includes a transistor amplifier stage 80 the base of which is connected to the output of flip-flop 58. The collector of transistor 80 is connected in parallel to three transistors 82, 84 and 86, each of which includes a relay coil 88, 90 and 92 in their respective collector circuits. When these three transistors are caused to conduct by the flip-flop, the relay coils operate the respective contacts of the chopper to alternate the measure input between the capacitors C1 and C2.

The circuit illustrated in FIG. 6a is an embodiment of the invention dispensing with the pair of diodes associated with potentiometer 30. This embodiment works on the same principle as that described above, and the circuit components are labeled in the same manner as the corresponding portion of the circuit of FIGS. 2 and 3. In this case, however, instead of series connecting potentiometer 30 with the thermistor 25, potentiometer 30 is connected across terminals 38a and 40b of the chopper circuit. With the chopper armatures in the illustrated position, positive pulses flow from terminal 38a, through diode 26 thermistor 25 through diode 28, and return to ground via terminal 40a and armature 40. When the armatures reverse their terminals, the positive pulses on armature 38 flows through terminal 38b bypass, thermistor 25 through diode 28, wire 16, potentiometer 30, terminal 40b and armature 40 to ground.

Another form of the circuit embodiment is illustrated in FIG. 6b. The corresponding components in this case are also numbered in the same manner as above but this circuit further includes a third switch having an armature 98 which is mechanically linked to armatures 38 and 40. The output to be measured is taken alternately from the slidable tap 31 of potentiometer 30 through switch terminal 98a, or directly from terminal 38b, and coupled in the manner above described to storage capacitors S1 and C2, which are coupled to the servo of the recorder. In this case also, the tap 31 is mechanically driven by the output of the servo. The circuit of FIG. 6b has a particular advantage in that almost no current passes through the tap 31; therefore, any potentials generated across it are cancelled.

If the thermistor changes its resistance value between two consecutive charge pulses for one of the storage capacitors, that capacitor must be charged to a higher voltage during the next charging time. This occurs with the same time constant as before, and may be able to recharge the capacitor up to ninety percent of the voltage difference. For practical purposes, it is only necessary to consider negative temperature steps since positive temperature increases, though possible, are very rare. The worst case occurs when the temperature gradient in the water has a step function. In this case, the desired accuracy will normally be reached within three or four pulses.

A significant problem would occur in detecting two temperature steps immediately following each other. For example, to detect two consecutive steps of ten to twenty degrees centigrade, ten feet apart, the chopper frequency should be at least thirty-two cycles per second. This is higher than the maximum permissible frequency at the end of the drop, as explained above. However, such big temperature steps inevitably occur near the surface of the water, wherein a higher frequency may be used. Indeed, this is an additional indication of the necessity of varying the frequency during the measuring cycle.

Another problem which may arise is the generation of an active current due to the metallic sea water electrodes at the remote sensor and at the local source position. Such electrodes can develop into active current generating sources of random amplitude and polarity if they are subject to any net D.C., i.e., an asymmetrical current pulse duration, etc. This battery effect will add and subtract from the alternating voltage developed by the constant current signal and produce a net error at the measuring terminals.

Preventing formation of battery potential is possible if both the source and sensor sea water electrodes are maintained free of any direct current electrolysis contamination before and during the measurement interval. This requires that both electrodes be renewed prior to every measurement, and can be accomplished by launching both the sensor (including its remote electrode) and the local electrode at the same time. The electrodes must be stored in a non-contaminating environment. Furthermore, current flow from each electrode must be completely free from any net D.C. during measurement. This can be achieved if the constant current alternating source is symmetrical, and no stray paths exist between the local electrode and the launching ship. This may be accomplished with relative ease by utilizing high and low frequency synchronized make-before-break choppers and a constant D.C. source to obtain a constant alternating signal with no residual average D.C. However, such a system requires that the measuring system be D.C. isolated from the ship's ground, which is generally undesirable. Hence, an alternative solution would be to return the system ground to the ship's ground reference through a D.C. nulling circuit. By maintaining a reasonably high gain servo loop, the net D.C. current flowing between ground references could be made nearly zero, thus maintaining nearly zero potential across the ground reference terminals. This type of correction, besides maintaining both ground references at the same D.C. potential, further tends to prevent formation of battery EMF at the local electrode by reducing to a very small value any net D.C. between the local electrode and ship's ground. If desired, electronic regulators could be used in place of an electro-mechanical servo-system.

A further solution to this problem would involve measurement of the generated electrode EMF together with incorporation of a null voltage to cancel the introduced error.

(B) TWO WIRE SYSTEM

FIGURE 7 is a block diagram of a two wire system which compensates for resistance changes due to temperature excursions, while providing a continuous analog and/or digital representation of ocean temperature as a function of depth. In FIGURE 7, the resistance of the thermistor is illustrated schematically as R56, and the resistances of the wires is illustrated as R60 and R62, respectively. Electrode 155 is coupled to a shipboard electrode 190 through an electrical return path through the ocean or body of water itelf. The impedance of the sea return path is substantially independent of depth, but because of temperature changes may very from between twenty and fifty ohms in the practical ranges envisioned. It will be shown that this variation has no material effect on the actual measuring circuits.

Shipboard electrode 190 is coupled to a programming circuit 192 which automatically controls the system operation. Thus, when the probe is deployed into the water, a signal is detected by shipboard electrode 190 through the sea return path to energize a display 194, which, in a preferred embodiment, may be a conventional strip chart recorder. Hence, effectively, programmer 192 starts the recorder of display 194 when the probe hits the water. At the same time, a control signal is applied to a switching circuit 198 to which thermistor R56 is coupled via uncoiling the wires which are being deployed in both horizontal and vertical directions as explained above.

A calibrating circuit 100 may be normally coupled through switch 198 to the measuring device 102 to calibrate the recorder prior to the actual measuring step. Programmer 192, when actuated, operates switching circuit 198 to disconnect the calibrating circuits 100 and connect both of the wires (and thermistor R56) to the measuring circuit 102. The output of measuring circuit 102 is an analog voltage which is coupled to display 194. An important feature of the invention is the fact that the recorder of display unit 194 is driven at a rate of speed accurately related to the substantially constant rate of descent of the probe, so that when the analog of the return voltage is recorded on a properly graduated scale the resultant graph represents the temperature of the ocean as a function of its depth. Another feature of the invention is the provision of a mechanical feedback loop between display 194 and measuring circuits 102 to linearize the output of the recorder with respect to temperature, and also to compensate the gain characteristics of the system so that the effects of the variation in the thermistor resistor change per degree centigrade over the temperature range encountered may be minimized. The calibrating features are more fully explained with respect to FIGURE 8 below.

The invention also contemplates the direct recording of other properties of the water. For example, the precise velocity of sound at various depths of the ocean is of critical importance in sonar systems. Thus, depth and temperature information from display 194 may be coupled to conventional slide wires on recorder 104 which produce two outputs indicative of depth and sound velocity. These outputs may be utilized directly, or instead, coupled to an analog to digital converter 106 which feeds the information to a tape punch 108 to record the data in digital form.

Figure 8:
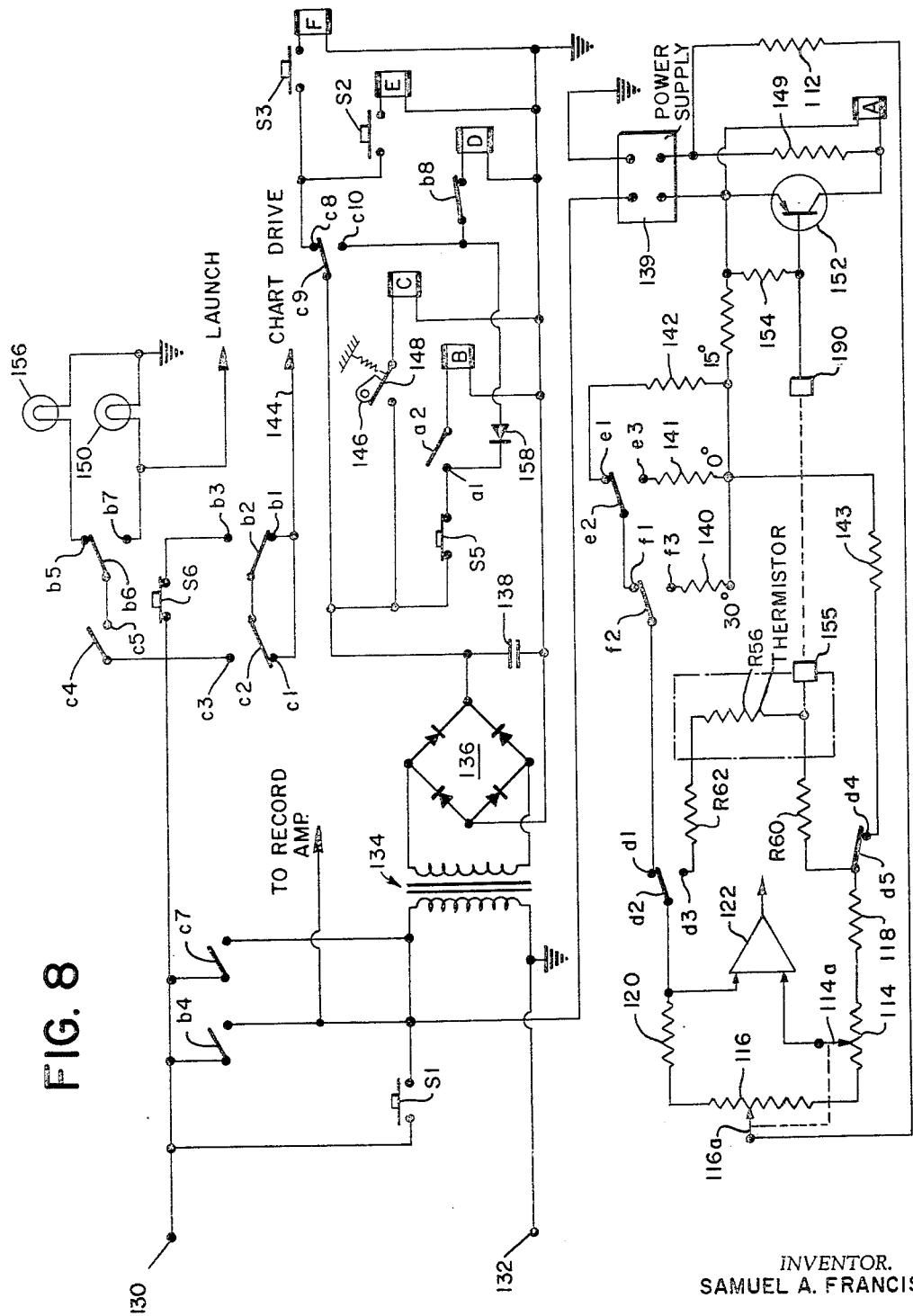
FIG. 8 is a circuit diagram of a portion of the electronic apparatus illustrated in block form in FIG. 7.

FIGURE 8 is a schematic diagram of the programming circuits illustrated in block diagram form in FIGURE 7. FIGURE 8 also includes a measuring bridge, similar to that employed in Patent No. 3,221,556. As disclosed in this patent, the two wire system is used to compensate for resistance changes in the wire due to temperature differentials. For practical purposes, it may be assumed that the probe will encounter temperatures ranging from 30 to −2° C. Because of this wide temperature excursion, the significant change in resistance of the deployed wire would normally be confused with the thermistor changes of resistance, producing considerable errors. Also of importance is the fact that the gain characteristics of the system will vary due to the variation in the thermistor rate of change of resistance with respect to temperature. This rate may vary by as much as a factor of 5 over the temperature range encountered.

The measuring circuit used to linearize the recorder output with respect to temperature by compensating for the above facts is illustrated in FIG. 8. The portion of the circuit which effects the compensation is basically a Wheatstone bridge and includes a power supply 139 which is connected to a relatively high resistance 112 connected effectively in series with the sea return path between the electrodes 155 and 190, electrode 155 being connected to one junction of the bridge. Resistor 112 should have a relatively high resistance to minimize the relatively slight change in resistance of the sea return path at different temperatures.

One leg of the bridge comprises the thermistor R56 and copper wire R62. The leg which balances that leg includes copper wire R60, which compensates for changes in resistance of wire R62 since both wires are subjected to identical temperatures and thus, the same resistance changes. As noted, the junction of thermistor R56 and wire R60 is coupled to the sea electrode 155 of the probe, which is in series with the sea return path and the power supply 139.

The rest of the bridge or measuring circuit is located in the electronic equipment aboard the ship. The bridge includes variable resistors 114 and 116 having slidable taps 114a and 116a, respectively. A fixed resistance 118 is connected in series with wire R60 and one end of resistor 114. A second fixed resistance 120 is coupled between the ends of wire R62 and variable resistor 116. The output of the bridge is taken from the junction of resistor 120 and wire R62 and slidable tap 114a, and fed to error amplifier 122, which, in a known manner is coupled to a servo mechanism (not shown) to record a visible trace of the temperature on the moving chart.

The value of resistor 118 is equal to the minimum thermistor resistance, which is the thermistor resistance at 30° C. The value of resistor 114 is equal to the maximum thermistor resistor (i.e., the thermistor resistance at −2° C.) less the minimum thermistor resistance. Resistors 116 and 120 are both equal to one half the value of resistor 114. Slidable taps 114a and 116a are mechanically linked together and have the same shaped curve of resistance versus position. The two taps may be driven in a conventional manner by the servo which controls the recording apparatus so that they are positioned in accordance with the resistance value of thermistor 58.

At any condition of bridge balance, the resistance between tap 114a and the junction of resistors 114 and 118 is equal to the measured thermistor resistance minus the minimum thermistor resistance, while the resistance between tap 116a and the junction of resistors 116 and 114 will be equal to one half the difference between the measured thermistor resistance and the minimum thermistor resistance. It can, therefore, be shown that the resistance of the bridge arm between taps 114a and 116a is equal to the resistance of the arm between tap 116a and the junction of resistor 120 and wire R62. Similarly, the resistance of the arm including the wire R62 and the thermistor R56 is equal to the resistance of the bridge arm between the junction of thermistor R56 and wire R60 and tap 114a. Hence, it can be shown that for a bridge unbalance due to a change in the thermistor resistance, the output of the bridge per degrees centigrade varies by a much lower factor (i.e., a factor of "two") over the contemplated temperature range despite the 5 to 1 variation in the change of thermistor resistance with respect to temperature over this range. Additionally, variation in the source impedance of the bridge may provide additional gain compensation since it increases with the increase in the thermistor rate of resistance change.

The circuits illustrated in FIG. 8 are located aboard ship with the exception of thermistor resistance R56 which, of course, is within the probe, and the connecting wires which are deployed between the boat and probe, the resistances of which are indicated as lumped parameters at R60 and R62, respectively.

The programming circuitry is a relay control including six relays, A, B, C, D, E and F. For purposes of description, the movable and stationary contacts of each relay will be identified by the lower case letter corresponding to the energizing relay together with respective callout numerals. Thus, contacts a1, a2, etc., are the relay contacts responsive to operation of relay A.

Other than the circuits illustrated in FIGURE 8, the components shown in FIGURE 7 are conventional and well known in the art. Accordingly, further discussion of those elements will not be included herein. The circuit shown in FIGURE 8 is the schematic diagram of those circuits corresponding to programmer 192, switch 198, calibrating circuit 100, and measuring circuit 102.

The circuit includes a pair of terminals 130 and 132 adapted to be connected to an alternating source of current. A push-button switch S1 couples the alternating potential to a transformer 134, the secondary of which is coupled to full wave rectifier 136 and smoothing capacitor 138 to provide the relay power supply. Closure of switch S1 also couples the alternating potential to a second conventional power supply 139 whose output is a regulated voltage of, for example, seventy five volts for measuring and calibrating purposes.

The calibrating circuits include three resistors 140, 141, and 142 corresponding to thirty degrees centigrade, zero degrees centigrade and fifteen degrees centigrade, respectively. Resistor 142 is normally connected in the measuring arm of the bridge via relay armatures e2, f2, and d2, and through resistor 143 and contact d5. After the power supply 139 is activated, the measuring circuit is completed through resistor 112 and tap 116a, the other side of the power supply being connected to the common terminal of the calibrating resistors.

When power supply 139 is activated, its output voltage is also applied across relay A through resistor 149 to operate this relay. When relay A is operated, its armature 92 contacts terminal a1 which connects the output of relay supply 136 across relay B. Energization of relay B applies the alternating potential on terminal 130 through contact b3, armature b2 and the normally closed contacts of relay C to line 144 which drives the chart of the strip recorder. Contact b4 closes to apply the operating voltage to the recorder amplifier, and since the resistor 142 is connected in the measuring circuit, the recorder may be calibrated during this period with the known fifteen degree resistance in the circuit.

To provide automatic operation of the programmer, a cam 146 may be added to the recorder so that it rotates one revolution per record. For example, cam 146 may rotate one revolution for each twelve inches of chart travel. The cam operates to stop the chart drive and to indicate that the system is ready for the launching operation. After the launching initiates a recording sequence, the cam stops the chart drive at the end of the measurement cycle. The chart must be aligned with respect to the cam position when it is installed in the recorder in a manner which will be obvious to those skilled in the art.

At the proper reference point, cam 146 rotates and closes a switch 148 which energizes relay C via the relay power supply. When relay C is energized armature c2 contacts terminal c3 removing the potential at terminal 130 from line 144 to the chart drive, thus stopping the recorder. Simultaneously, armature c4 contacts c5 and applies the AC potential through armature b6 and contact b7 to launch the probes into the water in a manner to be described below. Closure of contact b7 also applies a potential to indicating light 150 showing that the launching operation is about to proceed. Contact c7 holds the AC potential across the two power supplies. Armature c9 switches to terminal c10 in the energizing circuit of relay D, but this relay is not energized because contact b8 is opened since relay B is energized.

The launch signal causes the probe to be deployed into the water and as soon as the probe strikes the water, the sea return path is closed between sea electrode 155 of the probe and electrode 190 of the ship. A normally nonconducting transistor 152 has its emitter and collector connected directly across the coil of relay A. A resistor 154 is connected in the base emitter circuit of transistor 152 so that when current is drawn through the sea return path, the current flow in resistor 154 biases the transistor into conduction. Conduction of transistor 152 short circuits the terminals of relay A de-energizing the relay and returning the contacts to their normal position. Thus, when armature 92 opens, the energizing source of relay B is removed and this relay is also released.

When contact b2 returns to terminal b1, the alternating voltage on terminal 130 is applied through contacts c3, c2, b2, and b1 to line 144 and the chart drive control to reinitiate movement of the recorder. At the same time, contacts d2 and d5 open terminals d1 and d4, respectively, to disconnect calibrating resistor 142 from the measuring circuit, and couple the circuits including the wires, represented by R60 and R62, and thermistor R56 into the measuring bridge as discussed above.

The calibrating circuit also includes a resistor 143 to compensate for the resistance of the second wire since the resistance of each of the calibrating resistances 140, 141, and 142 is equal to the resistance of the thermistor at the particular temperature to be calibrated plus the resistance of the wire.

Relay C remains energized by the closure of switch 148 due to cam 146 so that when release of relay B returns armature b6 to contact b5, terminal 130 is connected through c4, c5 and b6, b5 to a "measure" indicating light 156. Although contact b4 is opened, contact c7 maintains the AC supply to the respective power supplies.

As the probe falls, the changing resistance R56 is measured in accordance with the description of FIGURE 7, with the direct voltage being supplied by supply 139 through resistor 112 and the sea return path between electrodes 155 and 190. The output of amplifier 122 is coupled to the recorder which visibly prints an indication of temperature versus depth as determined by the constant descent of the probe.

At the end of the cycle, cam 146 permits switch 148 to open, releasing relay C and removing the AC from the power supplies, thus de-energizing all the components of the circuit.

During the automatic operation of the programmer as above described, the calibration process uses only the fifteen degree resistor 142. However, prior to the generation of the "launch" signal, resistors 140 and 141 may be alternatively connected into the calibrating circuit by means of switches S2 or S3 respectively. Thus, switch S2 energizes relay E which causes its armature e2 to contact terminal e3 connecting the zero degree resistor 141 in the measuring branch of the circuit. Similarly, switch S3 energizes relay F connecting resistor 140 through terminal f3 and armature f2 in the measuring circuit. When cam 146 initiates the launch sequence of the operation by energization of relay C, the opening of contacts c8 and c9 prevents operation of relays E and F. Opening of switch S5 prior to the launch sequence, i.e. operation of relay C releases relay B which deactivates the power supply and prevents operation of the system. Once relay C has been energized, relay B is held operated (until relay A is released) through a holding circuit including armature c9, terminal c10, diode 158, and closed contact a1. Opening of switch S6 will prevent a chart drive signal on line 144 during the initial warm-up and calibration period.

Figure 9:
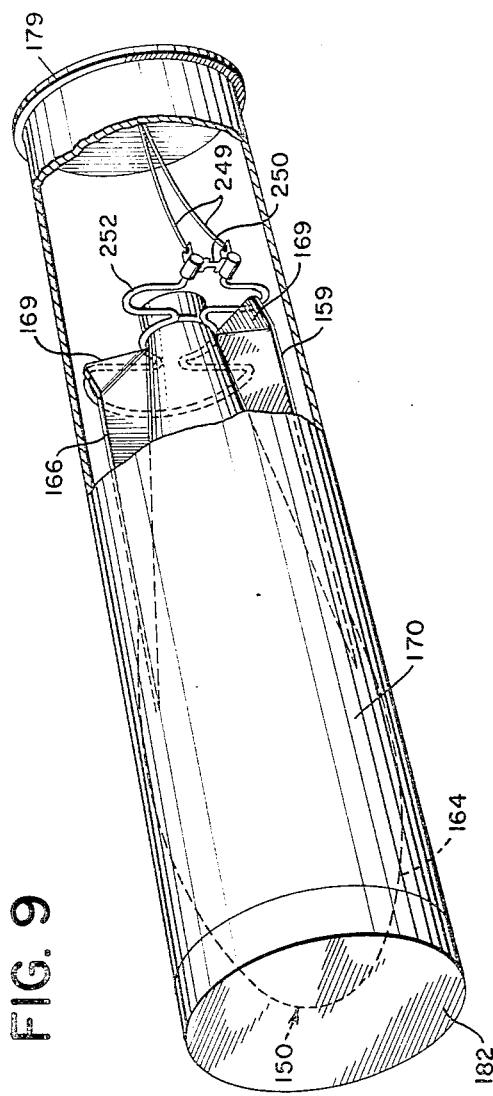
FIG. 9 is a perspective view showing apparatus for releasing the probe automatically from a moving vessel in response to a signal from the circuitry of FIGS. 7 and 8.

It is not necessary that the probe be manually deployed into the water by removal of the lanyard pin 172. If desired, the program unit 192 (see FIG. 7) can produce a signal which will automatically free the probe from the canister. A system for accomplishing this is illustrated in FIG. 9 which shows a pair of wires 249, over which the launch signal is received, connected across a fuse element 250 which closes a resilient member 252 to retain probe 150 within canister 170. When the launch signal is transmitted over lines 249, fuse 250 melts releasing the retainer spring 252 and enabling the probe to be deployed into the water by any of the above described methods.

(C) THREE WIRE SYSTEM

Figure 10:
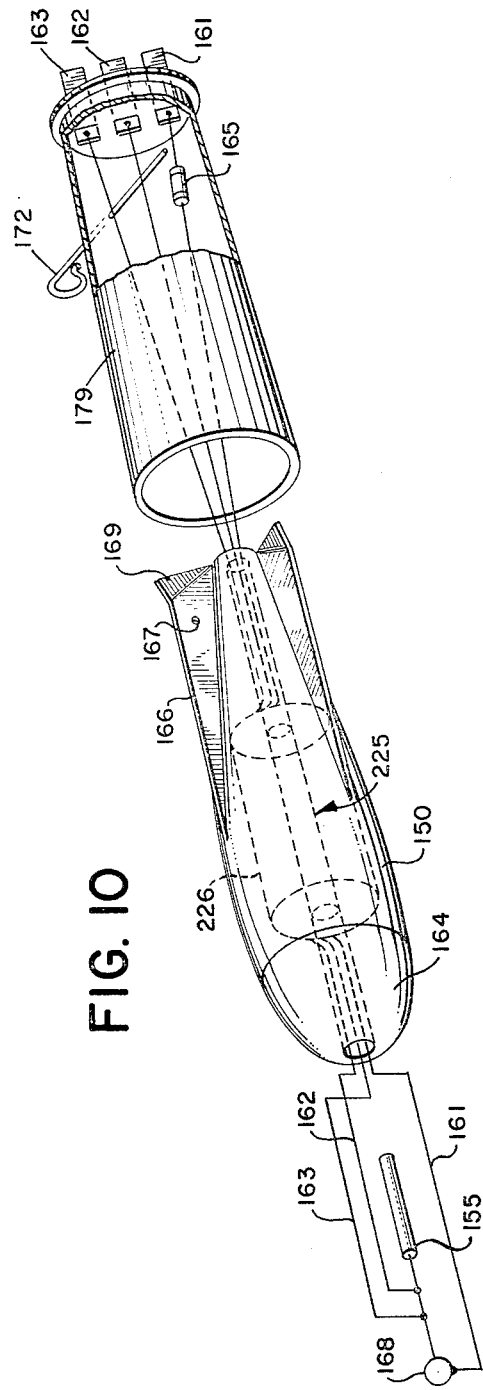
FIG. 10 is a perspective view of an aquatic three wire probe according to another embodiment of the invention.

FIGURE 10 is a schematic representation of a three-wire system which compensates for resistance changes in its conductors which result from temperature changes, and records the temperature of the ocean without the necessity for using the ocean water as a return path. As in the previous embodiments the probe is placed within canister 179 and is held therein by lanyard pin 172 which is placed through hole 167 in stabilizing fins 166. The probe consists of a thermistor 168, the resistance of which is a function of the surrounding temperature and is connected back to the measuring circuit by means of a three-wire circuit consisting of wires 161, 162 and 163. Sea electrode 155, which is connected to wires 162 and 163 and grounded to the system by the sea return path, serves only to send a signal back to the recording system when the probe contacts the sea to initiate the recording operation.

Figure 11:
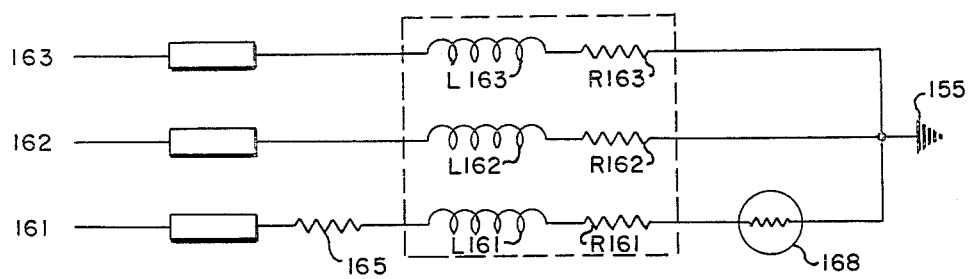
FIG. 11 is a circuit diagram of a portion of the electronic apparatus illustrated in FIG. 10.

Referring now to FIG. 11, an equivalent electrical schematic diagram of the three-wire system is shown. Inductors L161, L162 and L163 represent the equivalent inductances of wires 161, 162 and 163, respectively, while resistors R161, R162 and R163 represent the equivalent resistances of wires 161, 162 and 163, respectively. The inductances are of such low magnitude that their effect on the operation of the measuring system is negligible. The wire resistances R161 and R162 may be substituted into the measuring bridge circuit of FIG. 8 in place of resistances R60 and R62 while the resistance of the return wire R163 may be substituted in the circuitry between electrodes 155 and 190 in place of the dotted line sea return portion.

It has been found that optimum balancing of the bridge is obtained when the resistances of the two wires forming a part of the bridge circuit are equal. Therefore, an adjustable balancing resistor 165 is placed in series with one of the wires which may be of lower resistance. The value of the balancing resistor must be chosen empirically, as its value is a function of the particular wires being used. Moreover, it has been found advantageous to bond wires 161 and 162 together with the same envelope so that the effect of temperature changes on the wires will be identical.

The operation of the bridge and recording circuitry is otherwise the same as that in which the two wire system is used, except that the supply voltage 139 is now effectively connected through the third wire 163 instead of through the sea path between electrodes 155 and 190.

The probe contains thermistor 168, and sea electrode 155, secured within hollow passageway 225 which forms the core of spool 226 having conductors 161, 162 and 163 coiled thereon.

The probe is released from the moving vessel by release of lanyard pin 172 from hole 167 in probe 150. As the probe descends through the ocean, wires 161, 162 and 163 unwind from spool 226. A portion of the fluid flowing past the probe flows through passageway 225 and washes past thermistor 168, and electrode 155, and aids in the removal of the wires from spool 226 as it exits out of the tail of the probe.

The probe body 150 contains stabilizing fins 166 at the end portion thereof. The rate of the descent of the probe is controlled by the weight and dimension of the weighted head portion 164. Manufacturing errors cause asymmetrical pressure gradients which in turn causes the descent to vary away from the vertical. To compensate for this error, offset portions 169 are provided on the ends of fins 167, to cause the probe to rotate about its vertical axis.

A coil of wire is wound around a spool provided within the canister (not shown) which unwinds as the vessel moves so that the descent of the probe in the ocean is not influenced by horizontal motion of the vessel. Thus, as the vessel moves the spool unwinds releasing more wire, leaving the position of the probe unchanged with respect to the point at which it was originally deployed.

Although preferred embodiments of the invention have been illustrated and described, many modifications thereof will be obvious to those skilled in the art.

What is claimed is:

1. A device for measuring a property of a body of water at a location remote from a measuring station, comprising a remote sensor adapted to be deployed into said body of water having an impedance variable in relation to the property being measured, a source of electrical energy located at said measuring station, a transmission path connecting said source to said sensor, means for applying first pulses in one direction through said transmission path to said sensor, means for applying second pulses in the other direction through said transmission path but bypassing said sensor, means responive to the capacitance between said transmission path and the water for varying the frequency of said first and second pulses, and means for comparing said first and second pulses.

2. A device according to claim 1, including means for sampling a limited portion of said pulses for comparison purposes.

3. A device for measuring a property of a body of water at a location remote from a measuring station, comprising a remote sensor adapted to be deployed with said body of water having a resistance variable in relation to the property being measured, a source of electrical energy, a transmission path connecting said source to said sensor, a known resistance located at the measuring station within said transmission path, means for applying first pulses from said source to said sensor while bypassing said local resistance, means for applying second pulses from said source to said local resistance while bypasisng said sensor, means proportional to the capacitance between said transmission path and the water for varying the frequency of said first and second pulses, and means for comparing said first and second pulses.

4. A device according to claim 3, including means for sampling a limited portion of said first and second pulses for comparison purposes.

5. A device for measuring a property of water as a function of depth wherein a sensor probe is adapted to be deployed into and to traverse the water, comprising a sensor located within said probe, the resistance of said sensor being related to the property being measured, a single wire connecting said sensor to a local measuring station, a known local resistance connected to the wire at the local station, means for alternately applying first and second electrical pulses to said wire, said first pulses passing through said sensor while bypassing said local resistor, said second pulses passing through said local resistance while bypassing said sensor, means for storing said first and second pulses, means for varying the frequency of said first and second pulses to compensate for impedance changes in said wire, and means responsive to said storing means for recording said property as a function of depth.

6. A device according to claim 5, wherein said frequency varying means comprises means for reducing said frequency as the sensor is deployed into the water.

7. A device according to claim 5, including means for decoupling said storing means from said wire, until such pulses have reached a constant level determined by the resistance of the measuring circuit.

8. A device according to claim 7, including means coupled to the output of said storing means for varying said local resistance to minimize the difference between said local resistance and the resistance of said sensor.

9. A device according to claim 8, wherein said means for applying first and second pulses comprises a current source and chopper means for reversing the polarity of said current source with respect to said sensor, said chopper means further including means for coupling said first and second pulses to said storing means.

10. A null-balancing device for measuring a property of water as a function of depth, wherein a sensor probe is adapted to be deployed into the water, comprising a sensor located within said probe, the resistance of said sensor being related to the property being measured, a single wire connecting said sensor to a local measuring station, a variable local resistance connected to the wire at the local station, means for alternately applying first and second electrical pulses to said wire, said first pulses passing through said sensor while bypassing said local resistor, said second pulses passing through said local resistance while bypassing said sensor, first and second capacitances for storing said first and second pulses, respectively, differential amplifier means connected to said capacitances for producing an error voltage to be recorded, and means responsive to said error voltage for varying said local resistance.

11. A device according to claim 10, including means for reducing the frequencies of said first and second pulses as the sensor is deployed into the water.

12. A device according to claim 10, including means for decoupling said capacitances from said wire until said first and second pulses have reached a constant level determined by the resistance of the measuring circuit.

13. A single wire, sea return apparatus for measuring the temperature of water as a function of depth, comprising a sensor adapted to be deployed into the water, a thermistor located within said sensor, a first diode in series with said thermistor, a second oppositely poled diode connected across the series connection of said thermistor and said first diode, a wire connecting a local measuring station to said thermistor, said thermistor being returned to said measuring station through a sea return path, a local resistance in the measuring circuit at said local station, means for applying first current pulses through said wire, thermistor and first diode to said measuring station, means for applying second current pulses through said second diode and local resistance to said measuring circuits, a first capacitor for storing said first pulses, a second capacitor for storing said second pulses, differential amplifier means connected to said first and second capacitors for producing a voltage relative to the difference between the voltages stored in said capacitors, means for recording said difference voltage, and means responsive to said difference voltage for varying the local resistance whereby to null balance said apparatus.

14. Apparatus according to claim 13, including a third diode connected in series with said local resistance, and a fourth diode connected across said third diode and local resistance, said third and fourth diode being poled identically to said second and first diodes, respectively.

15. A single wire, sea return apparatus for measuring the temperature of water as a function of depth, comprising a sensor adapted to be deployed into the water, a thermistor located within said sensor, a first diode in series with said thermistor, a second oppositely poled diode connected across the series connection of said thermistor and said first diode, a single wire connecting a local measuring station to said thermistor, said thermistor being returned to said measuring station through a sea return path, a local resistance in the measuring circuit at said local station, means for transmitting first current pulses in one direction through said wire, thermistor and first diode to said measuring circuit, means for transmitting second current pulses in the opposite direction through said second diode and local resistance to said measuring station, a first capacitor for storing said first pulses, a second capacitor for storing said second pulses, differential amplifier means connected to said first and second capacitors for producing a voltage relative to the difference between the voltages stored in said capacitors, means for recording said difference voltage, means responsive to said difference voltage for varying the local resistance to null balance said apparatus, and means responsive to the depth of the probe for varying the frequencies of said pulses.

16. Apparatus according to claim 15, wherein said recording means includes means for moving a record medium at a rate related to the rate of descent of the probe, and said means for varying the frequencies is operatively associated with said moving means.

17. A device according to claim 10, wherein said variable local resistance comprises a potentiometer having a slidable tap, and switch means alternately connecting said slidable tap and one end of said potentiometer to said capacitances.

18. Apparatus according to claim 17, wherein said means for applying said pulses includes a bi-directional current source and further comprising diode means connected across said sensor.

19. An apparatus for measuring and recording the temperature of a body of water as a function of depth, comprising a probe having a conductive body, a first electrode secured within said probe and in contact with the sea, a thermistor secured within said probe, a first, second and third conductor means including wires wherein said first and second wires are connected across said thermistor and said second and third wires are connected to said first electrode within said probe, compensating means for producing a signal proportional to the temperature of the water, said compensating means having a second electrode in contact with the sea and connected to the remote ends of the three wires of said conductor means, and means for measuring and recording said signal as a function of the depth of said probe in the water.

20. In a system for measuring a property of a fluid as a function of depth wherein a sensor probe is adapted to traverse the fluid, an electrode carried by said sensor probe, means at a remote station for recording said property, means at said remote station for actuating said recording means in response to a flow of current from said electrode when said electrode engages the fluid.

21. The system as claimed in claim 20, wherein said actuating means include switch means comprising a semiconductor device.

22. The system as claimed in claim 21, wherein said switch means includes an energizing circuit for said semiconductor device, said energizing circuit including bias means for actuating said switch means in response to said flow of current from said electrode through said bias means.

23. An apparatus for measuring and recording the temperature of a body of water as a function of depth from a remote location comprising; a conductive probe adapted to be deployed into the water, a thermistor located within said probe, conductor means having two wires connected across said thermistor at one end; wherein one of said wires is also connected to the conductive body of said probe, a measuring circuit means producing a signal responsive to the temperature of said thermistor, said measuring circuit means having an electrode in contact with the sea and connected to the other end of said conductor means and the sea return path between the conductive body of said probe and the electrode, said measuring circuit including compensating means for compensating thermal variation in the resistance of said two wires and variation in the rate of change of resistance of said thermistor, and means for recording said signal as a function of the depth of said probe in the water.

24. The apparatus as recited in claim 23 wherein said recording means comprises a recorder at said remote location having one recording axis moving at a velocity proportional to the rate of descent of said probe.

25. The apparatus as recited in claim 24 wherein said measuring circuit means comprises a resistive bridge circuit having said conductor wires coupled to adjacent arms of said bridge and the sea electrode coupled to the common intersection of said wires on said bridge.

26. The system as claimed in claim 20, wherein a thermistor is located within said probe, conductor means having two wires connected across said thermistor at one end; wherein one of said wires is also connected to the conductive body of said probe, a measuring circuit means producing a signal response to the temperature of said thermistor, said measuring circuit means having an electrode in contact with the sea and connected to the other end of said conductor means and the sea return path between the conductive body of said probe and the electrode, said measuring circuit further including compensating means for compensating the effect of thermal variation of the resistance of said two wires and the rate of change of resistance of said thermistor with temperature.

27. The system as recited in claim 26, wherein recording means comprises a recorder at said remote location having one recording axis moving at a velocity proportional to the rate of descent of said probe.

28. The system as recited in claim 26, wherein said measuring circuit means comprises a resistive bridge circuit having said conductor wires coupled to adjacent arms of said bridge and the sea electrode coupled to the common intersection of said wires on said bridge.

29. The apparatus of claim 23 further comprising means responsive to the flow of current in said sea return path for energizing said recording means.

30. The apparatus of claim 29 wherein said measuring circuit means comprises a resistive bridge circuit having said conductor wires coupled to adjacent arms of said bridge and the sea electrode coupled to the common intersection of said wires on said bridge, comprising calibrating resistor means connected to said bridge circuit, said means responsive to said flow of current in said sea return path comprising means for disconnecting said calibrating resistor means from said bridge circuit.

References Cited

UNITED STATES PATENTS 2,571,605  10/1951  Peters.
3,287,978  11/1966  Knudsen _____ 73—362
3,267,420  8/1966  Pure.
3,273,393  9/1966  Spark _____ 73—344

LOUIS R. PRINCE, Primary Examiner
FREDERICK SHOON, Assistant Examiner

U.S. Cl. X.R.

73—170, 362

PO-1050
(5/69)

UNITED STATES PATENT OFFICE
CERTIFICATE OF CORRECTION

Patent No. 3,483,749      Dated December 16, 1969

Inventor(s) SAMUEL A. FRANCIS

It is certified that error appears in the above-identified patent and that said Letters Patent are hereby corrected as shown below:

Column 16, line 30, after "circuit" insert -- means --

Column 16, line 55, after "circuit" insert -- means --

SIGNED AND
SEALED
JUN 2 1970

(SEAL)
Attest:

Edward M. Fletcher, Jr.
Attesting Officer

WILLIAM E. SCHUYLER, JR.
Commissioner of Patents